United States Patent
Hirano et al.

(10) Patent No.: US 12,395,028 B2
(45) Date of Patent: Aug. 19, 2025

(54) ARMATURE AND ELECTRIC MOTOR

(71) Applicant: Mitsubishi Electric Corporation, Tokyo (JP)

(72) Inventors: Satohiro Hirano, Tokyo (JP); Yosuke Takaishi, Tokyo (JP); Shunta Kashima, Tokyo (JP); Zaini Ariff, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/879,814

(22) PCT Filed: Dec. 14, 2022

(86) PCT No.: PCT/JP2022/045983
§ 371 (c)(1),
(2) Date: Dec. 30, 2024

(87) PCT Pub. No.: WO2024/127543
PCT Pub. Date: Jun. 20, 2024

(65) Prior Publication Data
US 2025/0175049 A1    May 29, 2025

(51) Int. Cl.
*H02K 3/28* (2006.01)
*H02K 3/18* (2006.01)
*H02K 3/52* (2006.01)
*H02K 41/03* (2006.01)

(52) U.S. Cl.
CPC .................. *H02K 3/28* (2013.01); *H02K 3/18* (2013.01); *H02K 3/522* (2013.01); *H02K 41/031* (2013.01); *H02K 2203/12* (2013.01)

(58) Field of Classification Search
CPC .. H02K 3/04; H02K 3/12; H02K 3/18; H02K 3/28; H02K 3/52–522
USPC ................... 310/12.21, 12.22, 184, 198, 208
See application file for complete search history.

(56) References Cited

U.S. PATENT DOCUMENTS 11,342,826 B2 *   5/2022   Katou .................... H02K 11/33

FOREIGN PATENT DOCUMENTS

| JP | H10-225035 A | 8/1998 |
|----|--------------|--------|
| JP | 2005-102477 A | 4/2005 |
| JP | 2016-052224 A | 4/2016 |
| JP | 2021-180596 A | 11/2021 |

(Continued)

OTHER PUBLICATIONS

WO-2019008848-A1 Machine translation (Year: 2019).*

(Continued)

*Primary Examiner* — Oluseye Iwarere
*Assistant Examiner* — Minki Chang
(74) *Attorney, Agent, or Firm* — XSENSUS LLP

(57) ABSTRACT

A movable element that is an armature includes teeth including iron cores, an insulating holding member, and winding portions in which a coil is formed by winding an electric wire around the iron cores on the insulating holding member, the teeth include the teeth that are first teeth including the winding portions for only a coil of a single phase and the tooth that is a second tooth including the winding portions for coils of two phases different from each other, and a single electric wire forms the winding portions in the tooth that is the second tooth and is continuously wound via an intermediate fixing member provided on the insulating holding member.

12 Claims, 17 Drawing Sheets

(56) References Cited

FOREIGN PATENT DOCUMENTS

| | | | |
|---|---|---|---|
| JP | 7080409 B1 | 6/2022 | |
| WO | WO-2019008848 A1 * | 1/2019 | ............... H02K 1/14 |
| WO | WO-2022201313 A1 * | 9/2022 | ............. H02K 21/16 |

OTHER PUBLICATIONS

WO-2022201313-A1 Machine translation (Year: 2022).*
International Search Report and Written Opinion mailed on Mar. 14, 2023, received for PCT Application PCT/JP2022/045983, filed on Dec. 14, 2022, 8 pages including English Translation.
Decision to Grant mailed on Jul. 4, 2023, received for JP Application 2023-530028, 5 pages including English Translation.

* cited by examiner

ARMATURE AND ELECTRIC MOTOR

CROSS-REFERENCE TO RELATED APPLICATION

This application is a national stage application, pursuant to 35 U.S.C. § 371, of International Patent Application No. PCT/JP2022/045983, filed Dec. 14, 2022, the entire contents of which are incorporated herein by reference.

FIELD

The present disclosure relates to an armature in which an electric wire is wound around a tooth and an electric motor including the armature.

BACKGROUND

Typically, for an electric motor including teeth wound by an electric wire, a structure has been known in which coils having a plurality of phases are wound around a single tooth in order to balance a cogging thrust or a cogging torque with a magnetomotive force.

Patent Literature 1 discloses a technique for reducing a connection process after winding, by winding coils of two different phases around a single tooth and winding the coils of phases by a single electric wire.

CITATION LIST

Patent Literature

Patent Literature 1: Japanese Patent Application Laid-open No. 10-225035

SUMMARY OF INVENTION

Problem to be Solved by the Invention

However, the technique disclosed in Patent Literature 1 has a problem in that, after winging an electric wire of a coil for one phase, an electric wire of a coil for another different phase is wound, and therefore, the number of winding processes and connection processes increases.

The present disclosure has been made in view of the above, and an object of the present disclosure is to obtain an armature that reduces the number of winding processes and the number of connection processes after winding.

Means to Solve the Problem

To solve the above problems and achieve the object, an armature according to the present disclosure is arranged to face a field system via an air gap and is driven by three-phase AC excitation. The armature includes a plurality of teeth including an iron core, an insulating holding member attached to the iron core, and a winding portion in which a coil is formed by winding an electric wire having an insulating cover around the iron core on the insulating holding member. The plurality of teeth includes a first tooth including only the winding portion for a single-phase coil and a second tooth including the winding portions for coils of two phases different from each other. In the second tooth, the winding portions of the two phases different from each other are configured by a single electric wire, and the electric wire is continuously wound via an intermediate fixing member provided on the insulating holding member.

Effects of the Invention

An armature according to the present disclosure achieves an effect that it is possible to reduce the number of winding processes and the number of connection processes after winding.

DESCRIPTION OF EMBODIMENTS

Hereinafter, an armature and an electric motor according to embodiments will be described in detail with reference to the drawings.

First Embodiment

Figure 1:
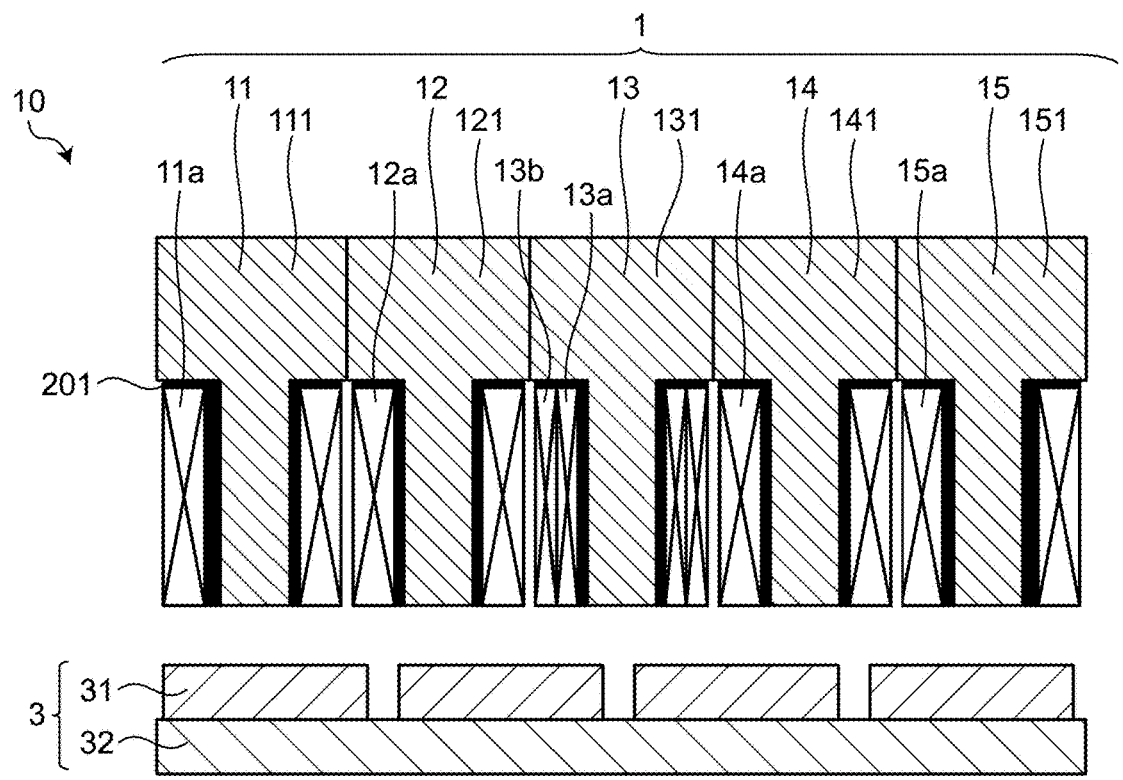
FIG. 1 is a schematic diagram of a cross section of a linear motor according to a first embodiment.

FIG. 1 is a schematic diagram of a cross section of a linear motor according to a first embodiment. A linear motor 10 according to the first embodiment includes a movable element 1 that is an armature and a stator 3 that is a field system facing the movable element 1 via an air gap. The stator 3 includes a permanent magnet 31 and an attachment seat 32 to which the permanent magnet 31 is fixed. The movable element 1 includes teeth 11, 12, 13, 14, and 15. The teeth 11, 12, 13, 14, and 15 respectively include iron cores 111, 121, 131, 141, and 151, an insulating holding member 201 having a function for holding an electric wire and an insulating function, and winding portions 11a, 12a, 13a, 13b, 14a, and 15a in which the electric wire having an insulating film is wound around the iron cores 111, 121, 131, 141, and 151 and the insulating holding member 201 on the insulating holding member 201 so as to form coils.

Figure 2:
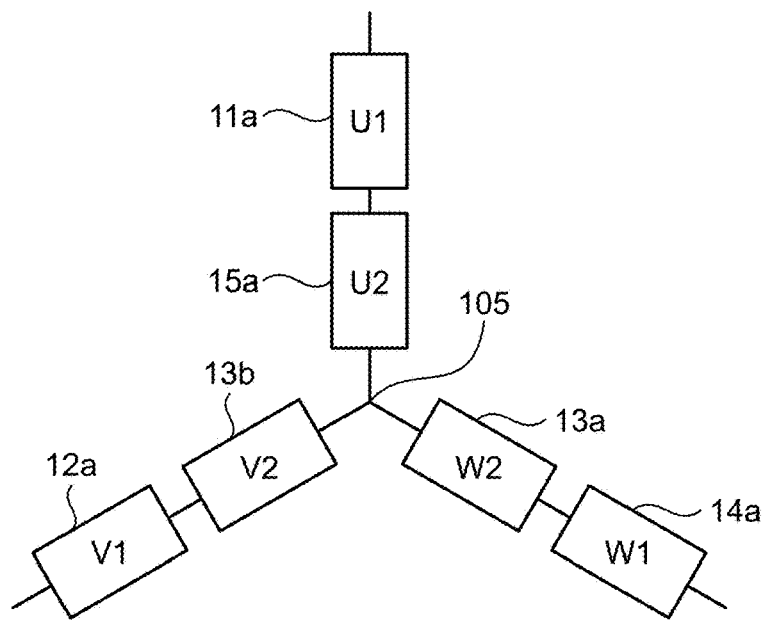
FIG. 2 is a connection diagram of the linear motor according to the first embodiment.

FIG. 2 is a connection diagram of the linear motor according to the first embodiment. The winding portions 11a and 15a form U-phase coils, the winding portions 12a and 13b form V-phase coils, and the winding portions 13a and 14a form W-phase coils. The winding portions 11a and 15a that are the U-phase coils, the winding portions 12a and 13b that are the V-phase coils, and the winding portions 14a and 13a that are the W-phase coils are each connected to each other in series, and the coils of the phases are connected by Y connection via a neutral point. That is, the tooth 13 includes winding portions of two different phases, including the winding portion 13b that is the V-phase coil and the winding portion 13a that is the W-phase coil. The winding portions 13a and 13b of the two different phases included in the tooth 13 are coils that are directly connected to the neutral point.

In a general electric motor driven by three-phase AC excitation having a concentrated winding structure, a single winding portion formed by winding the electric wire around a teeth iron core forms a single-phase coil. That is, in the general electric motor, the single tooth includes the single winding portion. On the other hand, the linear motor 10 according to the first embodiment has a structure in which the number of teeth is not a multiple of three, in order to achieve both of miniaturization and low thrust pulsation. The tooth 13 of the teeth 11, 12, 13, 14, and 15 includes the winding portions 13a and 13b for the coils with the two different phases.

Here, each of the teeth 11, 12, 14, and 15 respectively including the winding portions 11a, 12a, 14a, and 15a for only the coil of single phase is referred to as a first tooth, and the tooth 13 including the winding portions 13a and 13b for the coils of the two different phases is referred to as second tooth.

Figure 3:
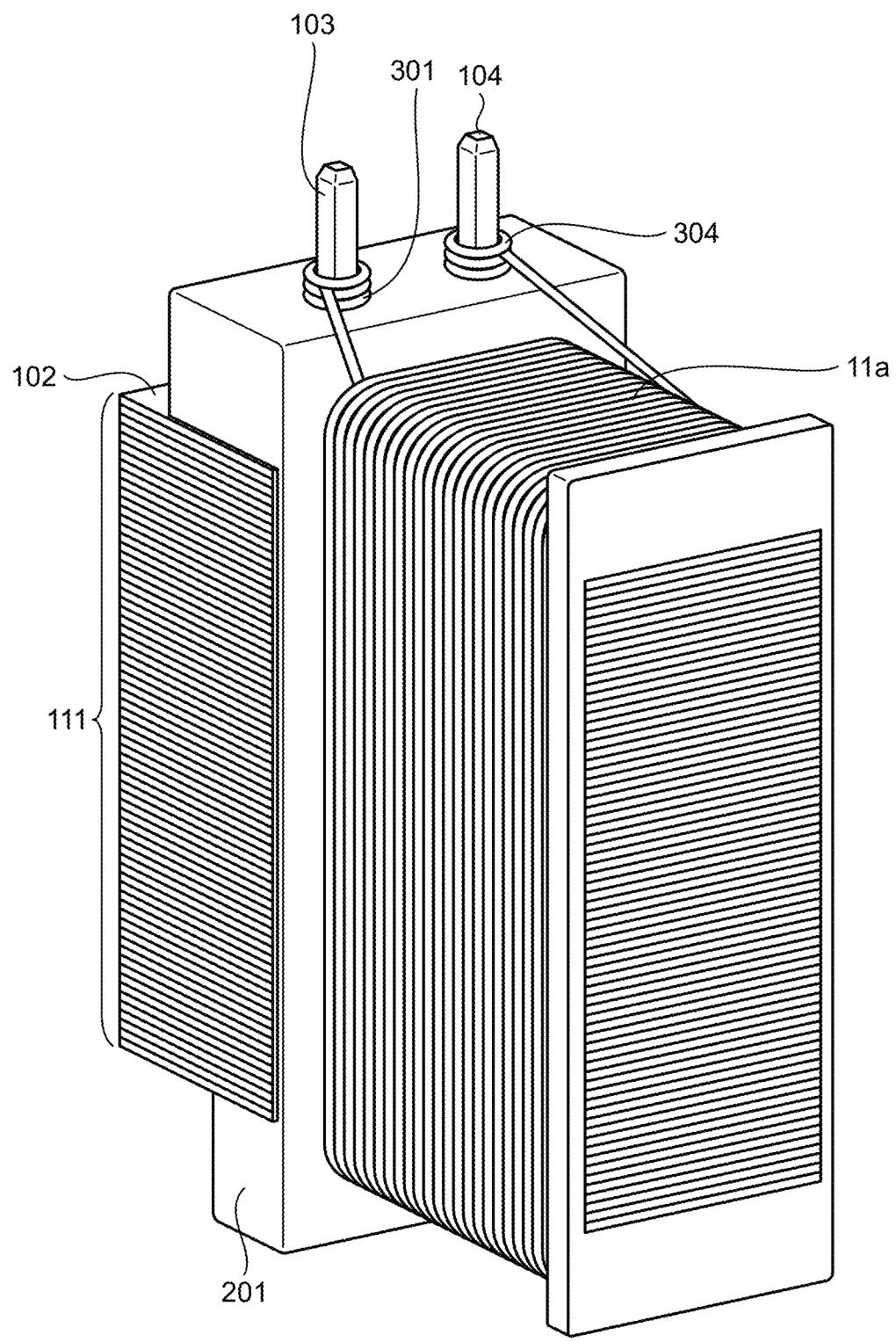
FIG. 3 is a perspective view of first tooth of the linear motor according to the first embodiment.

FIG. 3 is a perspective view of the first tooth of the linear motor according to the first embodiment. The iron core 111 is formed by stacking a plurality of electromagnetic steel sheets 102. Here, a winding start fixing member 103 and a winding end fixing member 104 are members that fix the electric wire by drawing and winding the electric wire in a winding process and are both fixed to the insulating holding member 201. The winding start fixing member 103 is used to fix the electric wire at the start of winding of the electric wire, and the winding end fixing member 104 is used at the end of the winding of the electric wire.

Here, a process for forming the coil in the first tooth will be described using the tooth 11 as an example. First, the electric wire is wound around the winding start fixing member 103, and a winding start portion 301 is formed. Then, the electric wire of a preset number of turns is wound around the insulating holding member 201 counterclockwise, and the winding portion 11a that generates a magnetic flux in the tooth 11 is formed. By forming the winding start portion 301 in advance, it is possible to prevent the electric wire from falling off from the insulating holding member 201 at the time of a winding process for forming the winding portion 11a. Thereafter, by winding the electric wire around the winding end fixing member 104 provided on the insulating holding member 201 similarly to the winding start portion 301, a winding end portion 304 is formed, and formation of the coil on the tooth 11 is completed. In this way, the coil of the tooth 11 includes only the winding portion 11a of the single phase. Note that, in each of the teeth 12, 14, and 15 that is also the first tooth, a coil is formed in the same process as the tooth 11.

Figure 4:
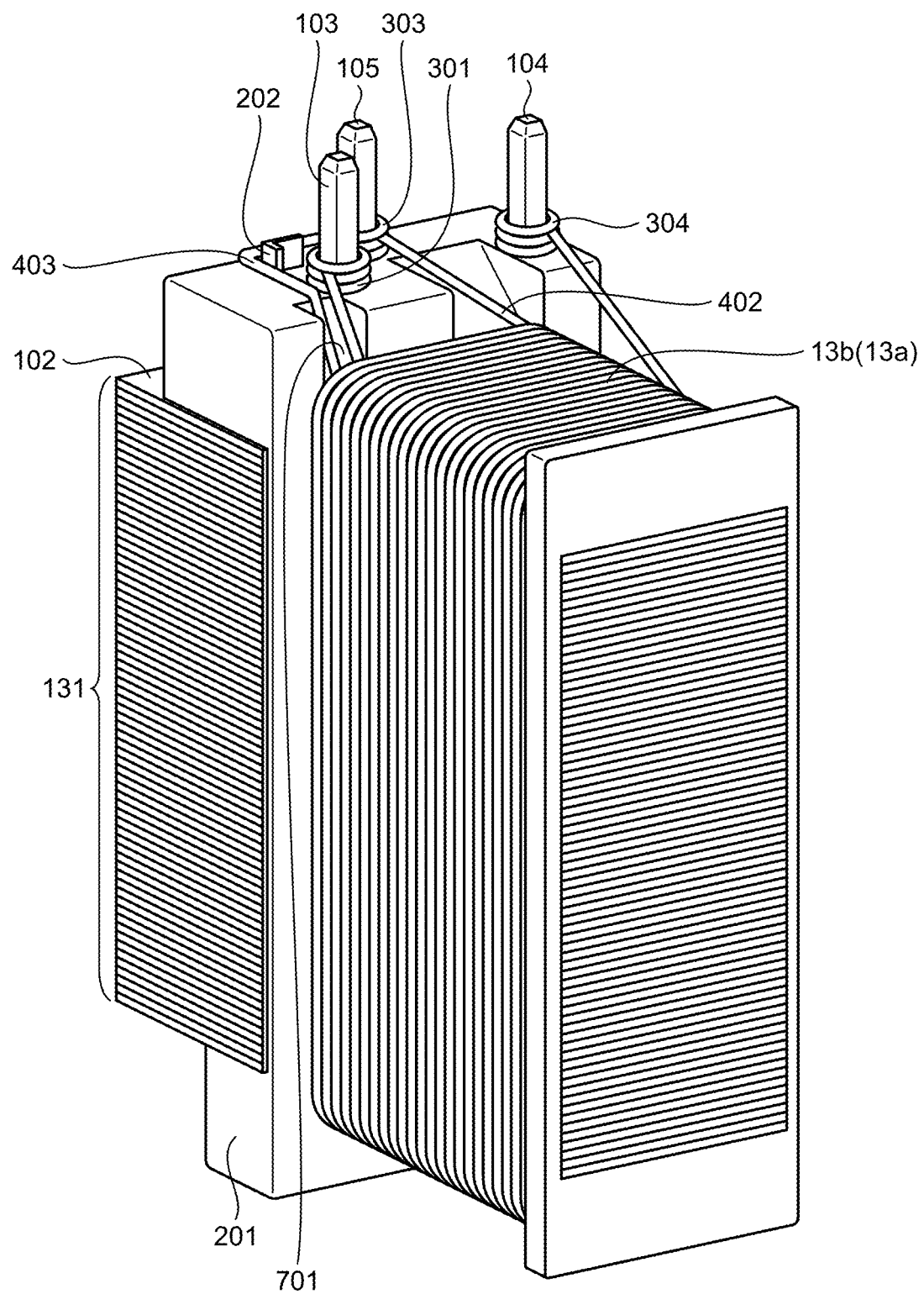
FIG. 4 is a perspective view of second tooth of an electric motor according to the first embodiment.
Figure 5:
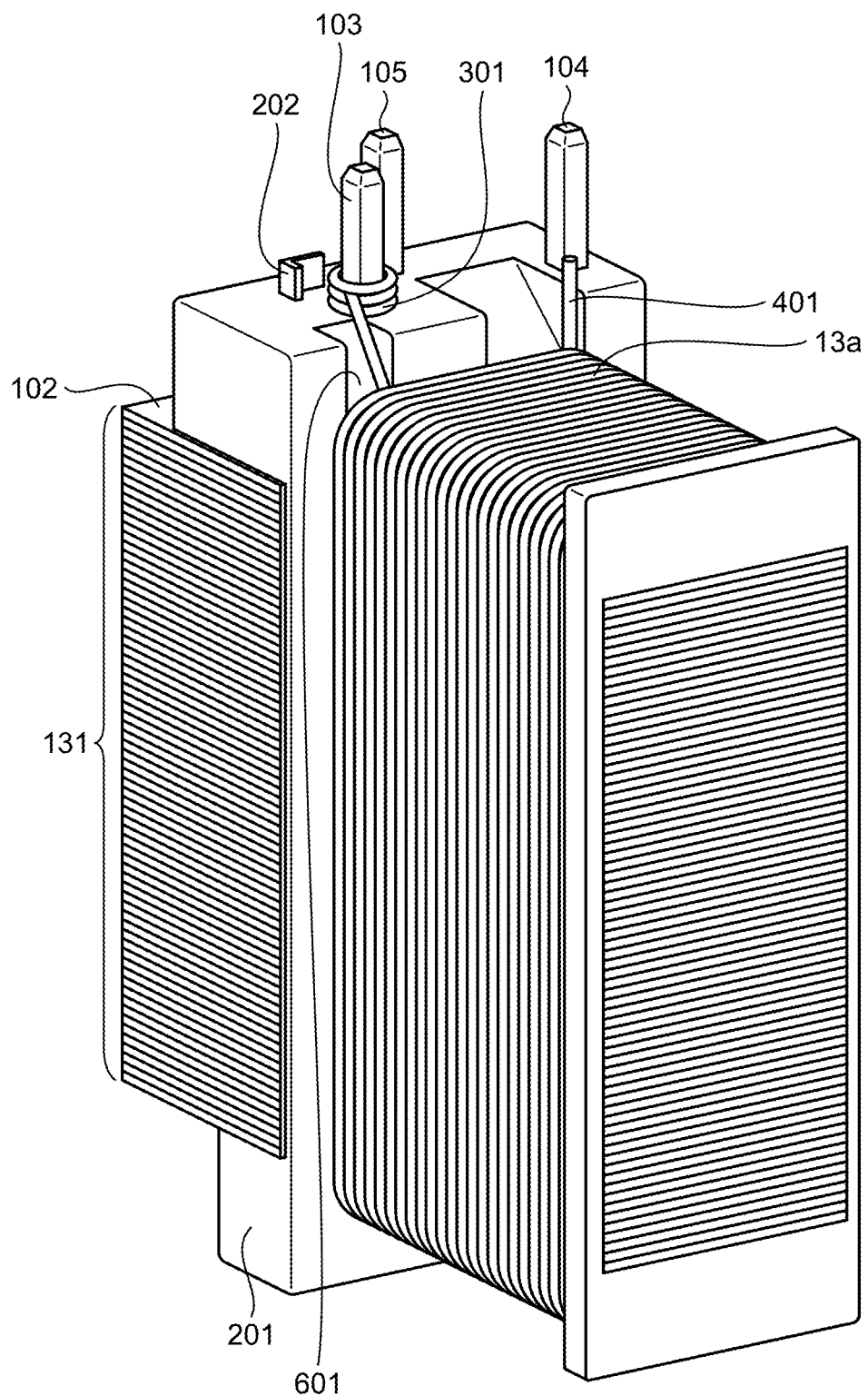
FIG. 5 is a diagram illustrating a second tooth manufacturing process of the electric motor according to the first embodiment.
Figure 6:
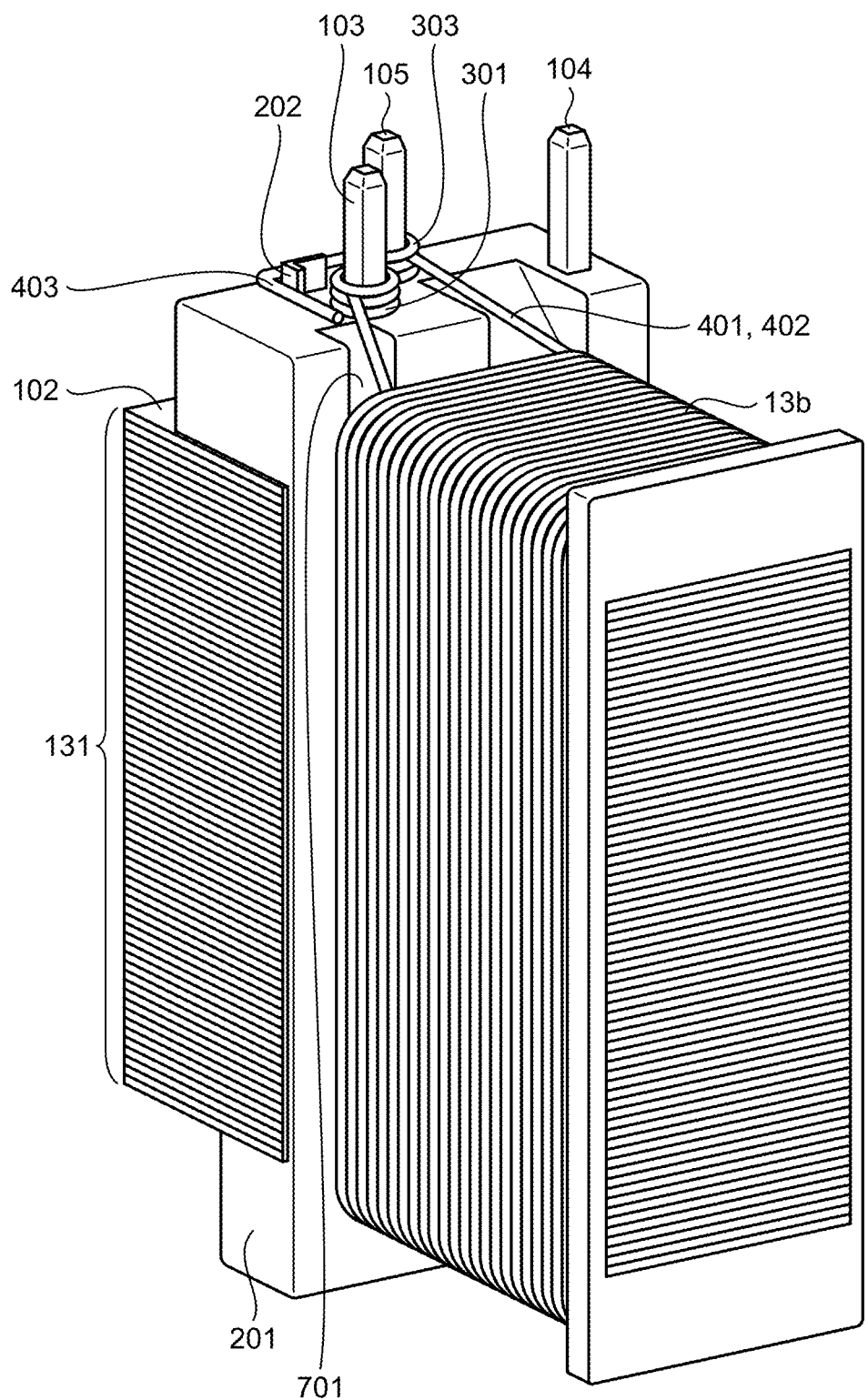
FIG. 6 is a diagram illustrating the second tooth manufacturing process of the electric motor according to the first embodiment.

FIG. 4 is a perspective view of the second tooth of the electric motor according to the first embodiment. FIGS. 5 and 6 are diagrams illustrating a second tooth manufacturing process of the electric motor according to the first embodiment. In the tooth 13 that is the second tooth including the winding portions 13a and 13b for the coils of the two different phases, as illustrated in FIG. 4, the insulating holding member 201 includes an intermediate fixing member 105, a crossover projection 202 used to arrange the electric wire therealong when a winding process of the winding portion 13b with the second phase to be described later is performed, and a winding start groove 701 that determines a position of a winding start electric wire of the winding portion 13b. The iron core 131 is formed by stacking the plurality of electromagnetic steel sheets 102.

First, an example of a winding process of a first phase is described. As illustrated in FIG. 5, the electric wire is wound around the winding start fixing member 103 so as to form the winding start portion 301. Thereafter, the electric wire of the preset number of turns is wound around the insulating holding member 201 counterclockwise so as to form the winding portion 13a that is the first phase. Note that, at this stage, unlike FIG. 4, a winding end electric wire 401 of the winding portion 13a is not wound around the winding end fixing member 104 and is in a freely movable state.

Next, winding of an intermediate portion 303 is performed to form the winding portion 13b that is the second phase. As illustrated in FIG. 6, the winding end electric wire 401 of the winding portion 13a is wound around the intermediate fixing member 105 provided between the winding start fixing member 103 and the winding end fixing member 104, and a crossover line 402 that connects the winding portion 13a and the intermediate portion 303 and the intermediate portion 303 that is an electric wire wound around the intermediate fixing member 105 are formed, and the electric wire is arranged in the winding start groove 701. At this time, the electric wire is arranged along the crossover projection 202 that is provided on the insulating holding member 201 so as not to have contact with the winding start fixing member 103, and a crossover line 403 that connects the neutral point and winding start of the winding portion 13b is formed. Thereafter, the electric wire is wound a preset number of times in the same direction as the winding portion 13a so as to overlap the winding portion 13a so as to form the winding portion 13b. Finally, the electric wire is wound around the winding end fixing member 104, and the winding end portion 304 is formed, and then, the electric wire is cut.

In this way, in the linear motor 10 according to the first embodiment, the single electric wire can be continuously wound around the winding portion 13a that is the first phase and the winding portion 13b that is the second phase, and it is possible to reduce the number of winding processes. Furthermore, as illustrated in FIG. 2, since the winding portions 13a and 13b are the coils directly connected to the neutral point, the intermediate fixing member 105 can serve as the neutral point at the time of connection. As a result, the number of end points of the electric wires forming the winding portions 11a, 12a, 13a, 13b, 14a, and 15a for the phases is reduced, and it is possible to reduce the number of connection processes.

Figure 7:
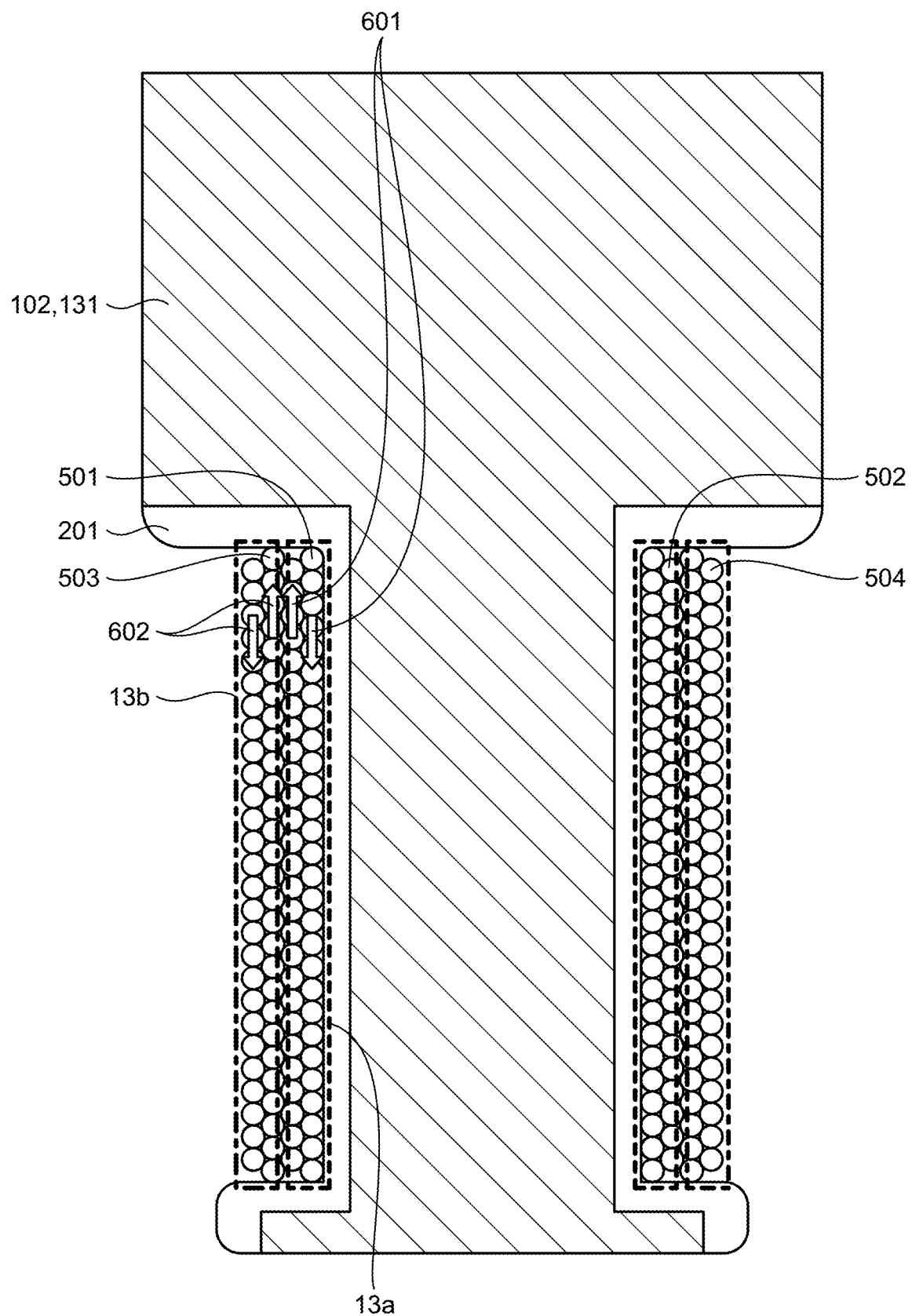
FIG. 7 is a schematic diagram illustrating a cross section of the second tooth of the linear motor according to the first embodiment.

FIG. 7 is a schematic diagram illustrating a cross section of the second tooth of the linear motor according to the first embodiment. The winding portion 13a that is the first phase is wound in counterclockwise so that the winding start electric wire 501 is used at the start of winding and a winding end electric wire 502 is used at the end the winding of the winding portion 13a that is the first phase. The winding portion 13b that is the second phase is wound in a winding direction similar to the winding portion 13a that is the first phase, so that a winding start electric wire 503 is used at the start winding and a winding end electric wire 504 is used at the end the winding.

Here, since the winding end electric wire 502 of the winding portion 13a that is the first phase is connected to the neutral point, a current flowing in the winding portion 13a is in a direction from the winding start electric wire 501 of the winding portion 13a to the winding end electric wire 502 of the winding portion 13a, that is, a direction of a current direction 601. On the other hand, since the winding start electric wire 503 of the winding portion 13b that is the second phase is connected to the neutral point, the current flowing direction is a direction from the winding end electric wire 504 to the winding start electric wire 503, that is, a direction of a current direction 602.

At this time, since the winding end electric wire 502 of the winding portion 13a and the winding start electric wire 503 of the winding portion 13b that are contact portions between the winding portion 13a that is the first phase and the winding portion 13b that is the second phase are connected to the side of the neutral point, a potential difference between the contact portions of the winding portions 13a and 13b caused by a surge voltage generated at the time of current excitation is smaller than that in a case where the winding end electric wire 502 of the winding portion 13a and the winding start electric wire 503 of the winding portion 13b are not connected to the neutral point. Due to a relative decrease in the potential difference between the winding portions 13a and 13b, in the contact portion between the winding portions 13a and 13b, it is possible to secure interphase insulation performance without providing an insulating member such as an insulating paper, for example. Therefore, it is possible to secure interphase insulation at the same time without lowering a winding space factor.

Note that, in the linear motor 10 according to the first embodiment, as illustrated in FIG. 4, the intermediate fixing member 105 is arranged between the winding start fixing member 103 and the winding end fixing member 104. However, it is sufficient to arrange the intermediate fixing member 105 in a state of being separated with a necessary insulation distance, the intermediate fixing member 105 does not necessarily need to be arranged between the winding start fixing member 103 and the winding end fixing member 104.

Furthermore, in the linear motor 10 according to the first embodiment, each of the winding portions 13a and 13b is wound counterclockwise. However, even if each of the winding portions 13a and 13b is wound clockwise, similar effects can be obtained. Furthermore, even if one of the winding portions 13a and 13b is wound clockwise and the other one is wound counterclockwise, the similar effects can be obtained. That is, in the tooth 13 that is the second tooth, the winding portions 13a and 13b of the two different phases may be wound around the iron core 131 and the insulating holding member 201 in the same winding direction or may be wound around the iron core 131 and the insulating holding member 201 in different winding directions from each other.

Furthermore, in the first embodiment, the linear motor 10 of which a field magnet of the stator 3 has four poles and the movable element 1 that is the armature has six phases has been described as an example. However, a combination of magnets and phases of the armature may be any combination as long as the linear motor 10 is appropriately driven.

Furthermore, although the linear motor 10 is described as an example in the first embodiment, the same can be implemented for a rotary electric machine.

With the linear motor 10 according to the first embodiment, it is possible to reduce the number of winding processes by continuously winding the winding portion 13a that is the first phase and the winding portion 13b that is the second phase, and it is possible to reduce the number of connection processes after winding, by providing the intermediate portion 303 between the winding portions 13a and 13b.

Second Embodiment

Figure 8:
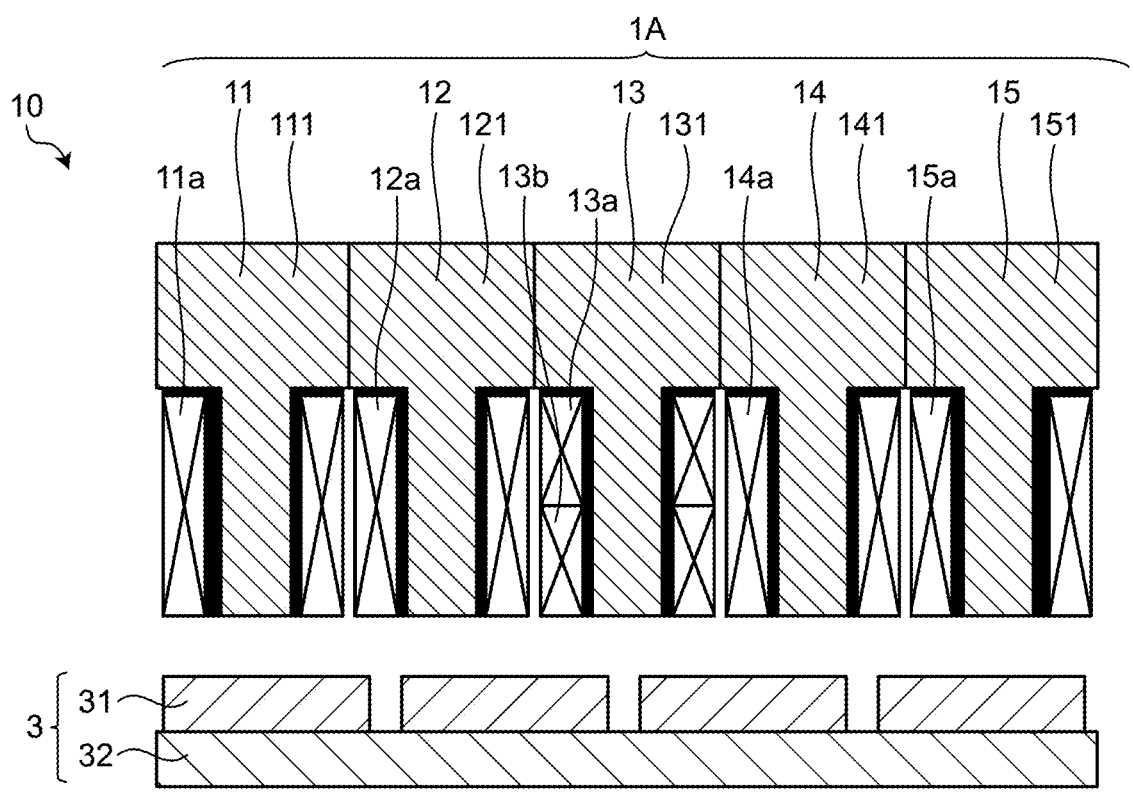
FIG. 8 is a schematic diagram of the cross section of the linear motor according to a second embodiment.

FIG. 8 is a schematic diagram of the cross section of the linear motor according to a second embodiment. Connection of a movable element 1A of the linear motor 10 according to the second embodiment is similar to that of the movable element 1 of the linear motor 10 according to the first embodiment. The tooth 13 is a second tooth including the winding portion 13b that is the V-phase coil and the winding portion 13a that is the W-phase coil, and the winding portions 13a and 13b are wound in a state of having contact with each other. In a case where the winding portions 13a and 13b constituting the coils of the two different phases are arranged along an arrangement direction of the movable element 1A and the stator 3, the winding portion 13a is closer to a core back portion of the tooth 13 than the winding portion 13b, and more magnetic fluxes pass therethrough. Therefore, the W phase having the winding portion 13a as a component has a higher induced voltage than the V phase having the winding portion 13b as a component.

Figure 9:
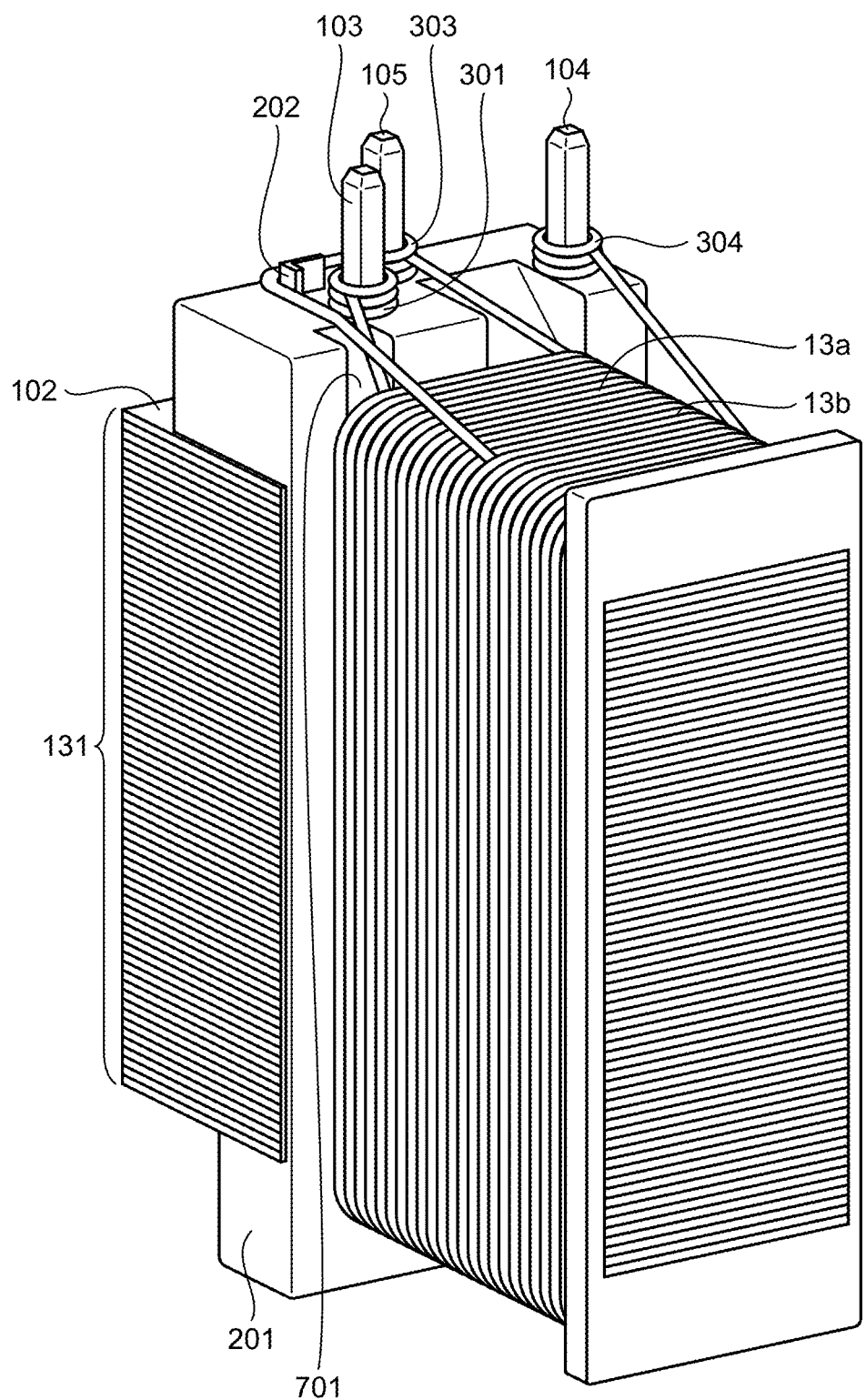
FIG. 9 is a perspective view of the second tooth of the linear motor according to the second embodiment.
Figure 10:
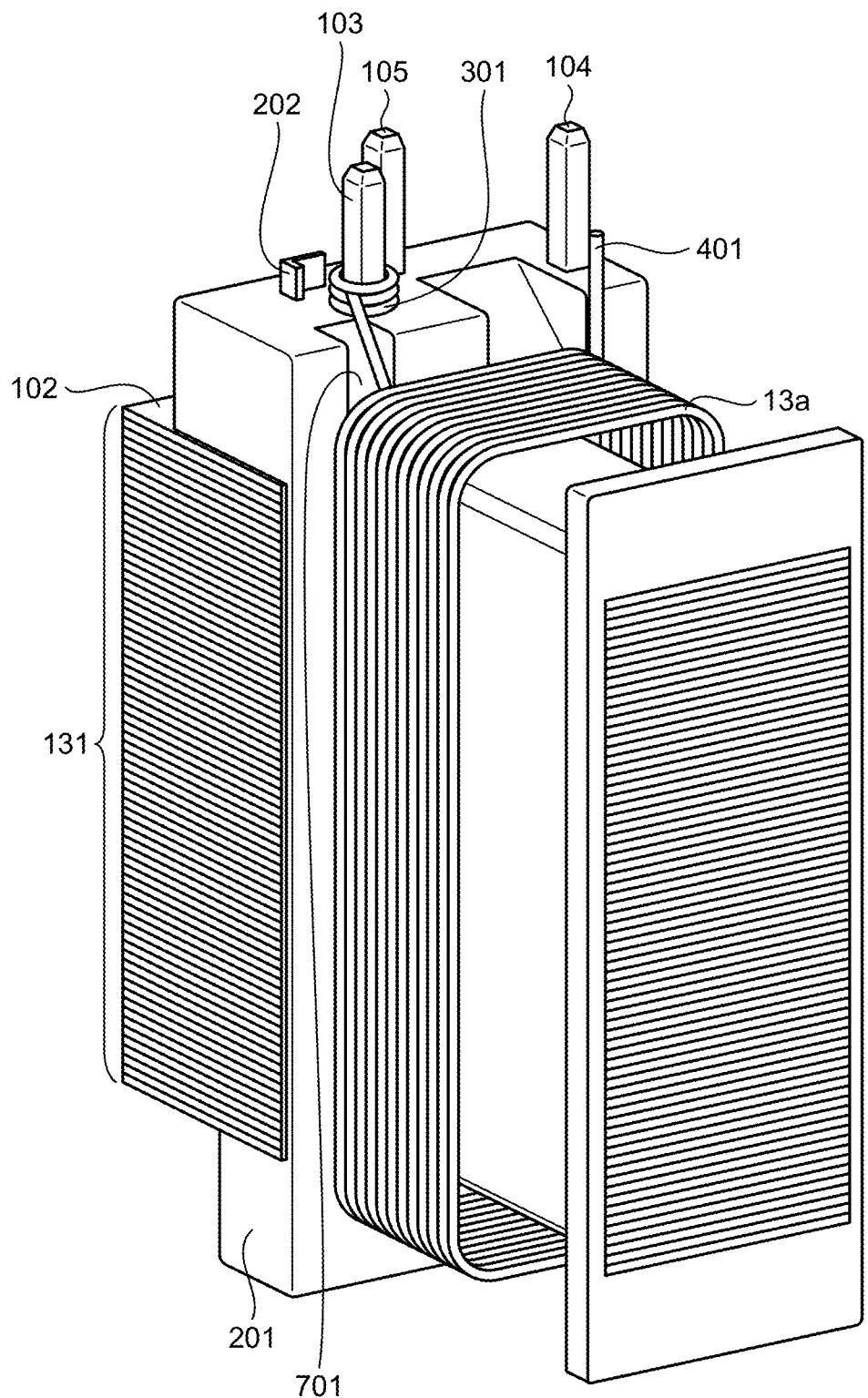
FIG. 10 is a diagram illustrating the second tooth manufacturing process of the linear motor according to the second embodiment.
Figure 11:
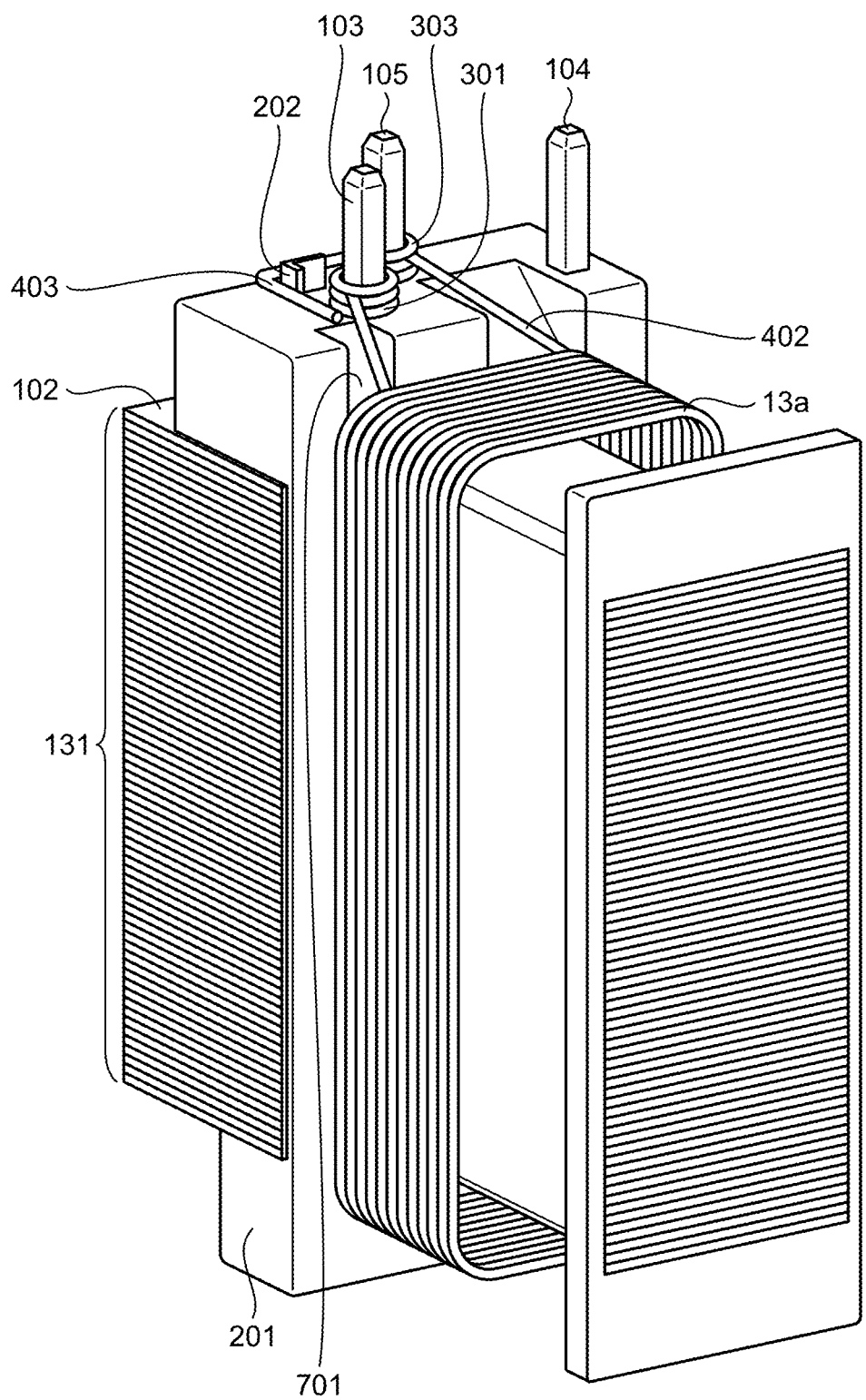
FIG. 11 is a diagram illustrating the second tooth manufacturing process of the linear motor according to the second embodiment.

FIG. 9 is a perspective view of the second tooth of the linear motor according to the second embodiment. FIGS. 10 and 11 are diagrams illustrating the manufacturing process of the second tooth of the linear motor according to the second embodiment. A process for forming a coil of the second tooth will be described from a winding process of the winding portion 13a that is the first phase. As illustrated in FIG. 10, the electric wire is wound around the winding start fixing member 103 so as to form the winding start portion 301. Thereafter, the electric wire of the preset number of turns is wound around the insulating holding member 201 counterclockwise so as to form the winding portion 13a that is the first phase. At this time, in order to perform winding of the second phase, a space is provided on a side of the stator 3 than the winding portion 13a, in the arrangement direction of the movable element 1A and the stator 3. At this stage, as illustrated in FIG. 10, the winding end electric wire 401 of the winding portion 13a that is the first phase is not wound around the winding end fixing member 104 and is in a freely movable state.

Next, winding of the intermediate portion 303 is performed to form the winding portion 13b that is the second phase. As illustrated in FIG. 11, the intermediate portion 303 is formed by winding the winding end electric wire 401 of the winding portion 13a around the intermediate fixing member 105 provided between the winding start fixing member 103 and the winding end fixing member 104, and the electric wire is disposed in the winding start groove 701. At this time, the electric wire is wound along the crossover projection 202 provided on the insulating holding member 201 so as not to have contact with the winding start fixing member 103. Thereafter, after the winding portion 13b is formed on a side of the stator 3 than the winding portion 13a, in the arrangement direction of the movable element 1A and the stator 3, by winding the electric wire counterclockwise a preset number of turns, the winding end portion 304 is formed by winding the electric wire around the winding end fixing member 104. By cutting the electric wire after forming the winding end portion 304, a winding state illustrated in FIG. 9 is obtained.

Figure 12:
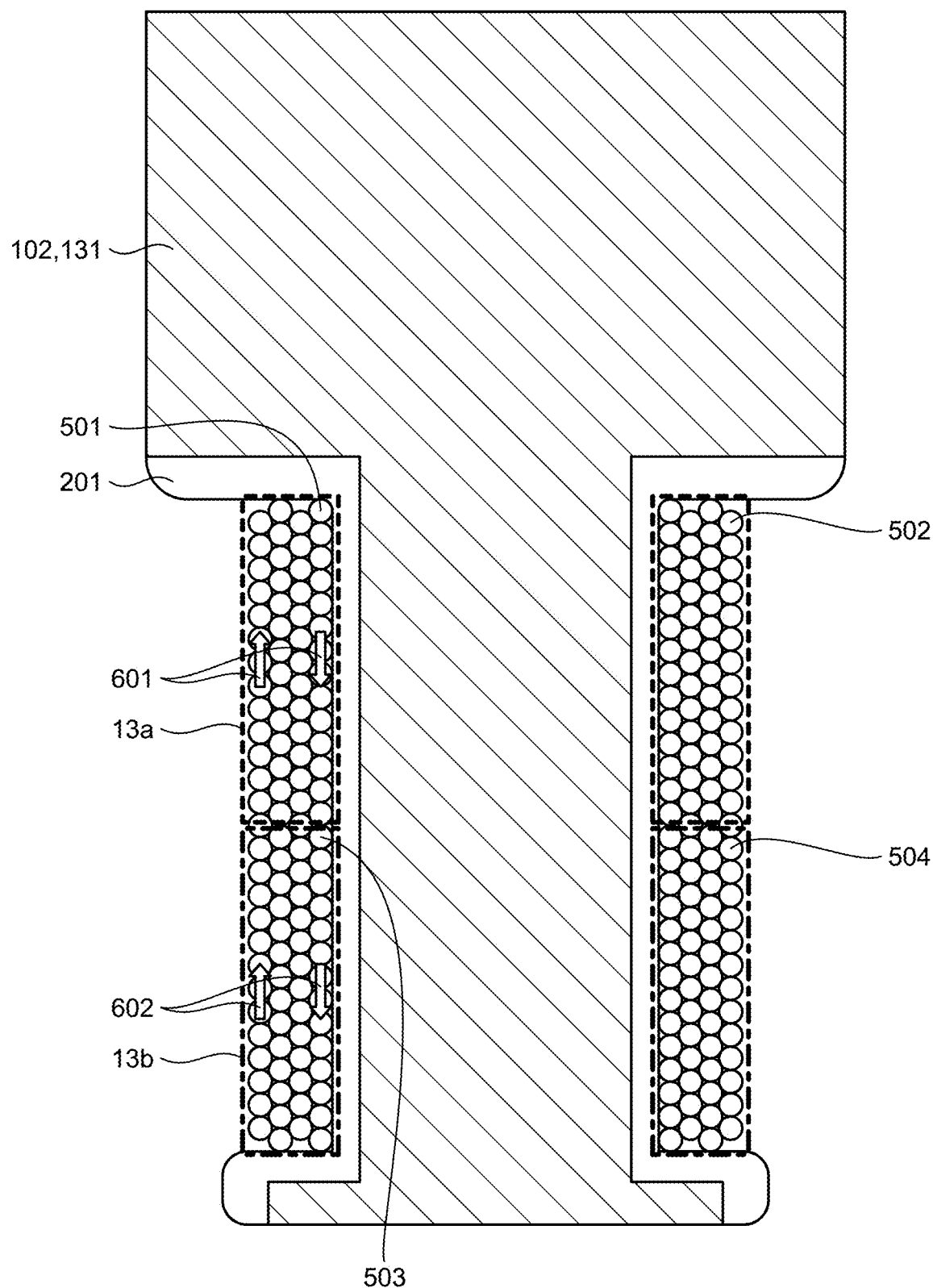
FIG. 12 is a schematic diagram illustrating the cross section of the second tooth of the linear motor according to the second embodiment.

FIG. 12 is a schematic diagram illustrating the cross section of the second tooth of the linear motor according to the second embodiment. The winding portion 13a that is the first phase is wound counterclockwise from the winding start electric wire 501 to the winding end electric wire 502. The winding portion 13b that is the second phase is wound counterclockwise from the winding start electric wire 503 to the winding end electric wire 504, similarly to the winding portion 13a with the first phase.

Here, since the winding end electric wire 502 of the winding portion 13a is connected to the neutral point, the direction of the current flowing in the winding portion 13a is in the direction from the winding start electric wire 501 of the winding portion 13a to the winding end electric wire 502, that is, the direction of the current direction 601. On the other hand, since the winding start electric wire 503 of the winding portion 13b is connected to the neutral point, the current flowing direction is the direction from the winding end electric wire 504 to the winding start electric wire 503, that is, the direction of the current direction 602. Therefore, in the linear motor 10 according to the second embodiment, it is possible to arrange the winding start electric wire 501 of the winding portion 13a and the winding end electric wire 504 of the winding portion 13b to be away from each other, and it is possible to avoid an insulation failure due to a sudden surge voltage, without providing the insulating member such as the insulating paper between the winding portions 13a and 13b. Therefore, it is possible to improve the winding space factor, and it is possible to reduce an effect on a temperature increase due to a copper loss on an electric motor having the same size.

In the linear motor 10 according to the second embodiment, since the winding portions 13a and 13b are arranged along the arrangement direction of the movable element 1A and the stator 3, it is possible to finely adjust the induced voltage in each phase, and it is possible to improve a degree of design freedom.

Third Embodiment

Figure 13:
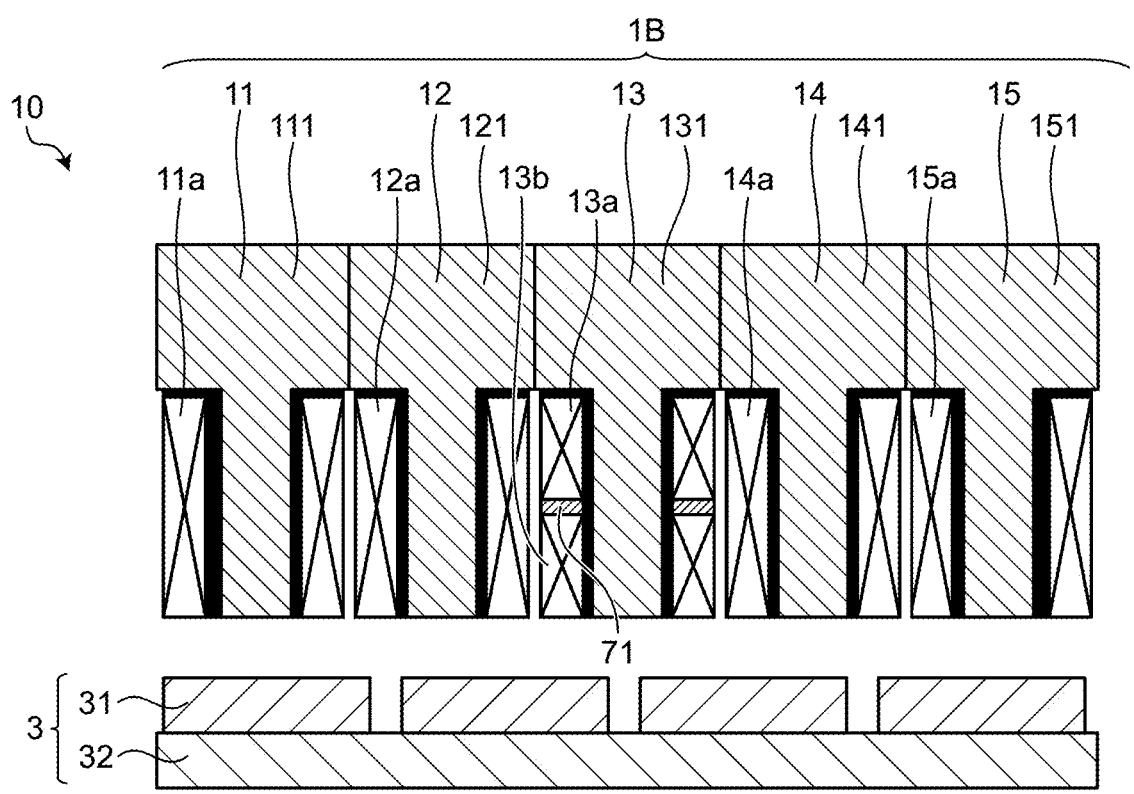
FIG. 13 is a schematic diagram of the cross section of the linear motor according to a third embodiment.

FIG. 13 is a schematic diagram of the cross section of the linear motor according to a third embodiment. In a movable element 1B of the linear motor 10 according to the third embodiment, a tooth 13 is a second tooth including the winding portion 13b that is the V-phase coil and the winding portion 13a that is the W-phase coil. The winding portions 13b and 13a are wound with an insulating member 71 interposed therebetween.

Figure 14:
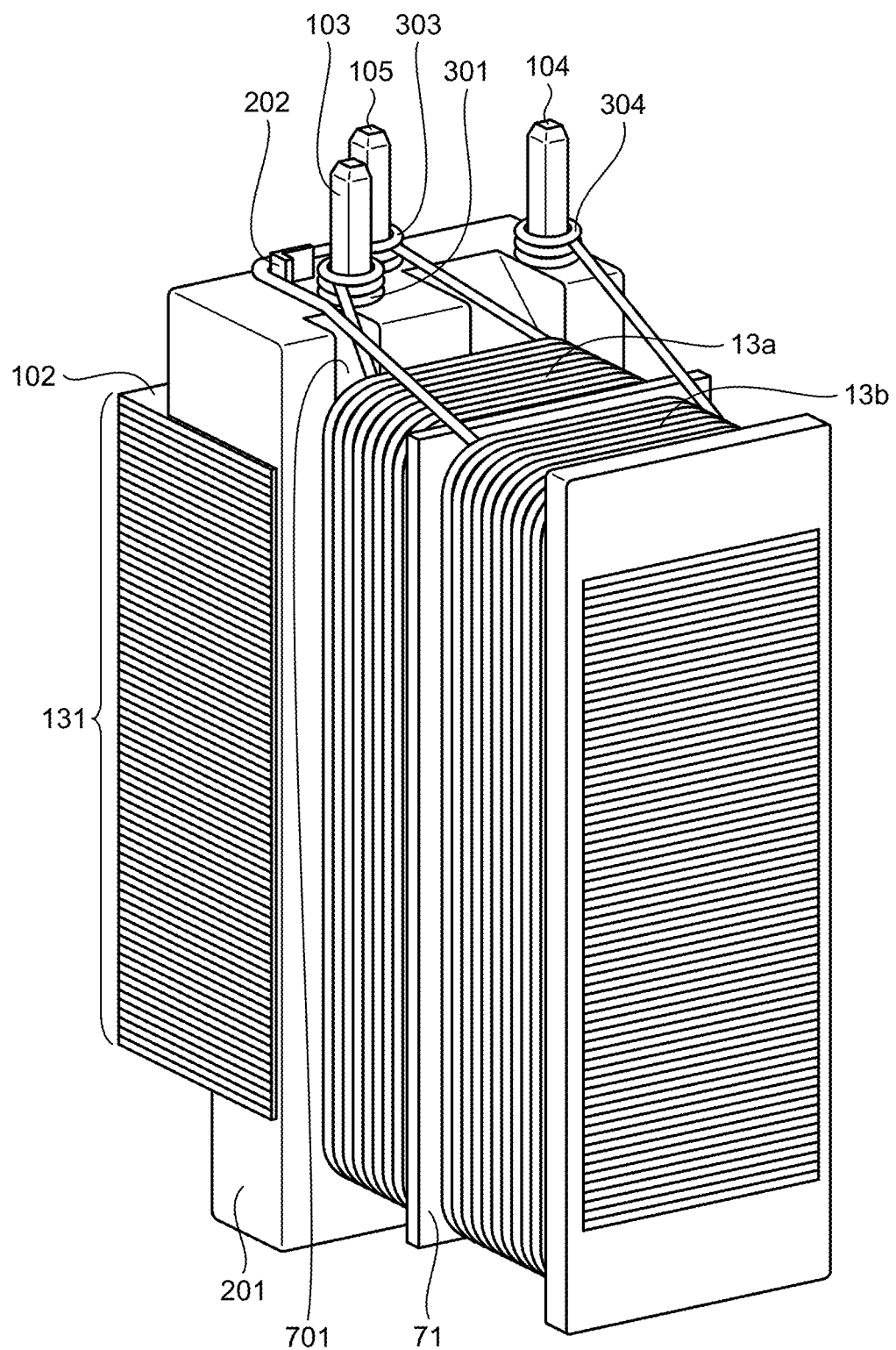
FIG. 14 is a perspective view of the second tooth of the linear motor according to the third embodiment.
Figure 15:
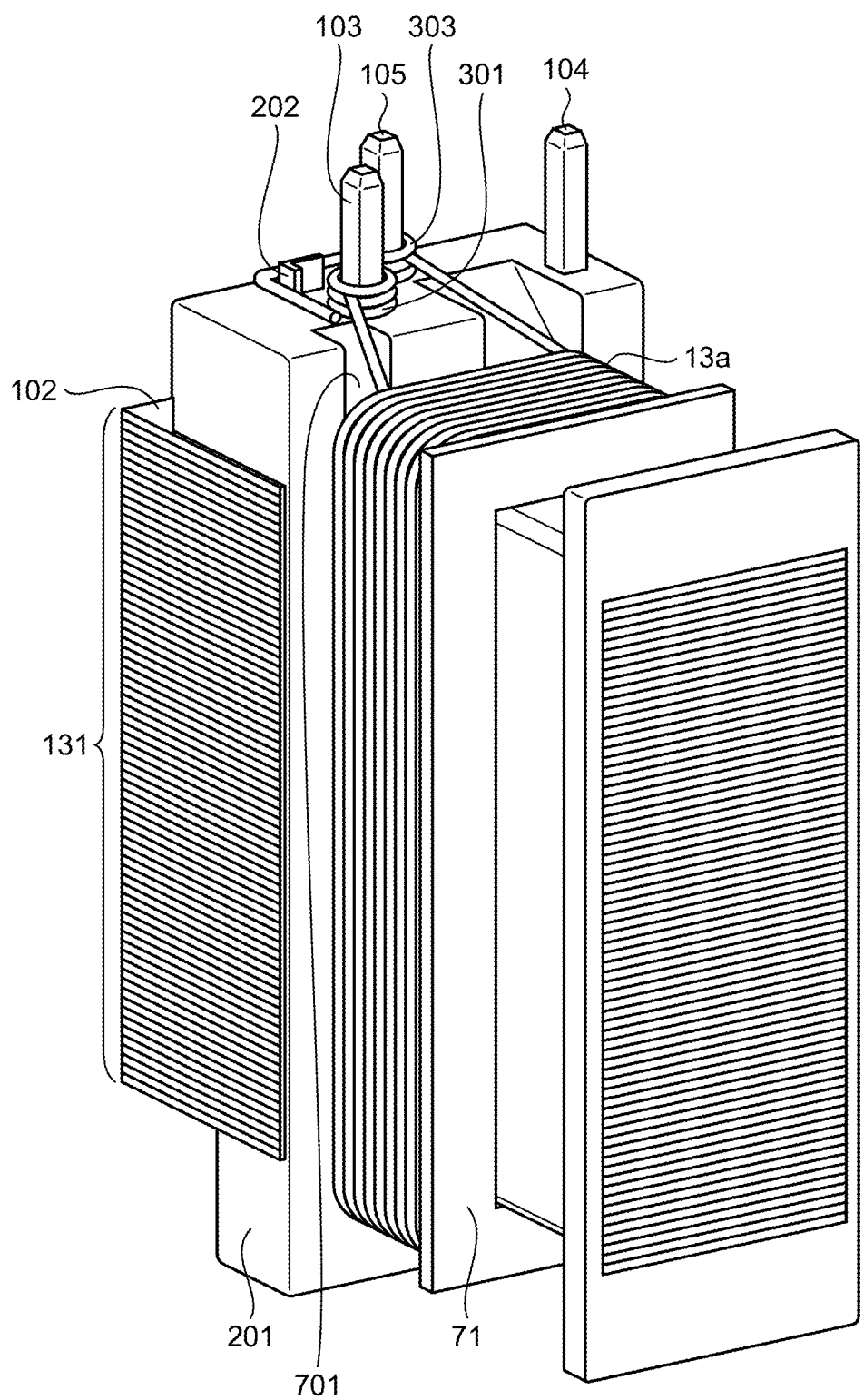
FIG. 15 is a diagram illustrating the second tooth manufacturing process of the linear motor according to the third embodiment.

FIG. 14 is a perspective view of the second tooth of the linear motor according to the third embodiment. FIG. 15 is a diagram illustrating the second tooth manufacturing process of the linear motor according to the third embodiment. A process for forming a coil of the second tooth will be described from a winding process of the winding portion 13a with the first phase. A process after the winding portion 13a is wound and before the electric wire is arranged in the winding start groove 701 is similar to that of the movable element 1A of the linear motor 10 according to the second embodiment. After disposing the electric wire in the winding start groove 701 after the winding portion 13a is wound, the second tooth is formed by winding the winding portion 13b that is the second phase, after disposing the insulating member 71 on a side of the stator 3 of the winding portion 13a in an arrangement direction of the movable element 1B and the stator 3. As in the movable element 1B of the linear motor 10 according to the third embodiment, by disposing the insulating member 71 between the winding portions 13a and 13b forming the coils having the different phases. This makes it possible to improve insulation resistance performance while reducing the number of winding processes.

Figure 16:
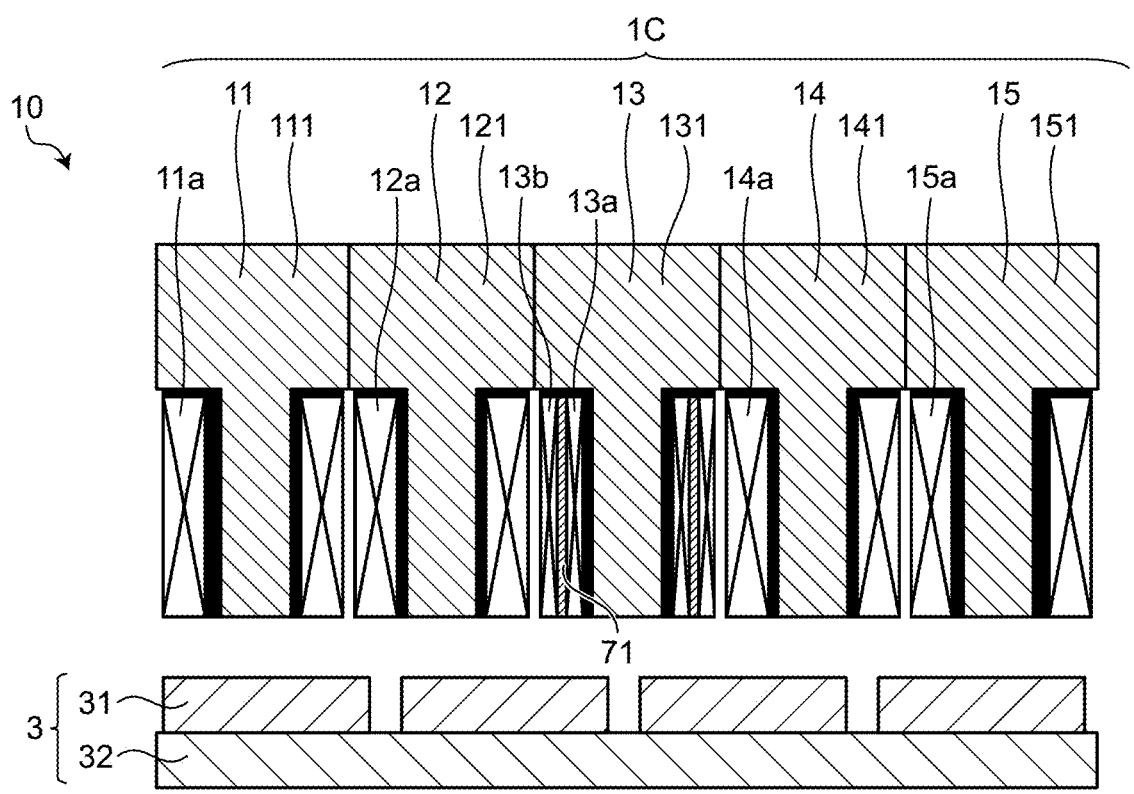
FIG. 16 is a schematic diagram of the cross section of the linear motor according to a modification of the third embodiment.

FIG. 16 is a schematic diagram of the cross section of the linear motor according to a modification of the third embodiment. In the movable element 1B of the linear motor 10 according to the third embodiment, the winding portions 13a and 13b are arranged along the arrangement direction of the movable element 1B and the stator 3. However, even if the winding portions 13a and 13b are arranged in a winding center direction, as in a movable element 1C of the linear motor 10 according to the modification of the third embodiment, similar effects can be obtained.

Fourth Embodiment

Figure 17:
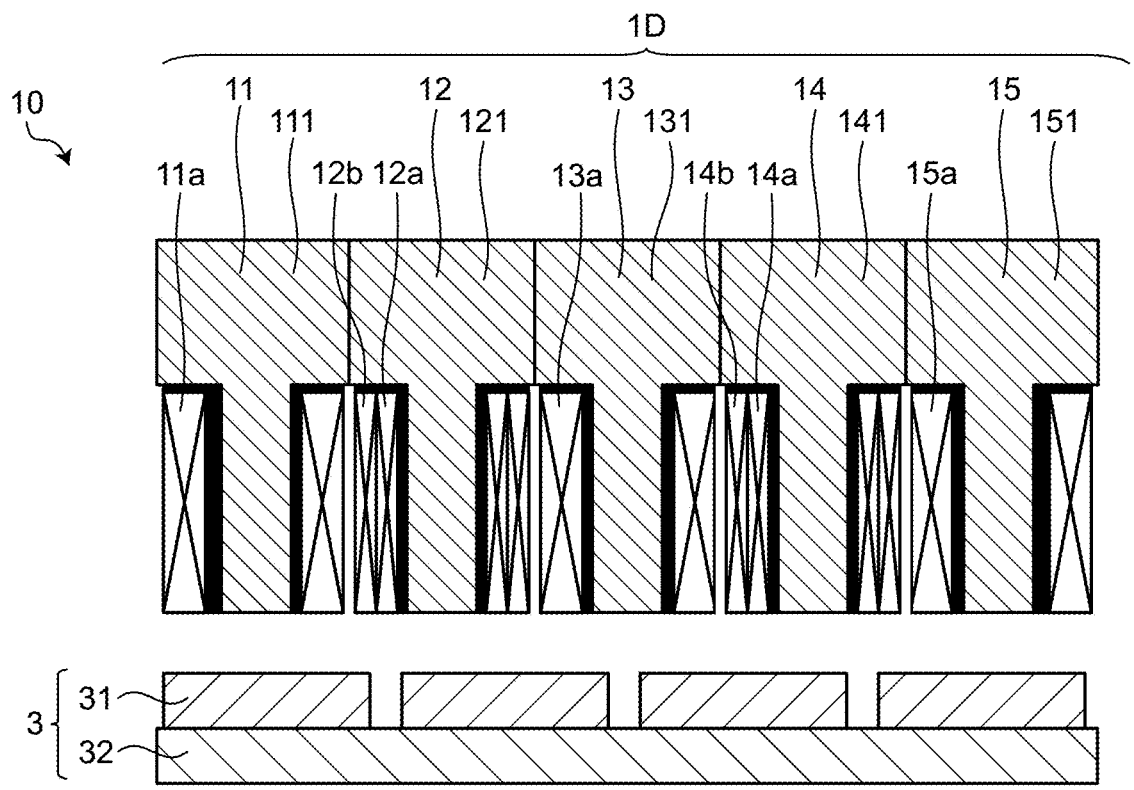
FIG. 17 is a schematic diagram of the cross section of the linear motor according to a fourth embodiment.
Figure 18:
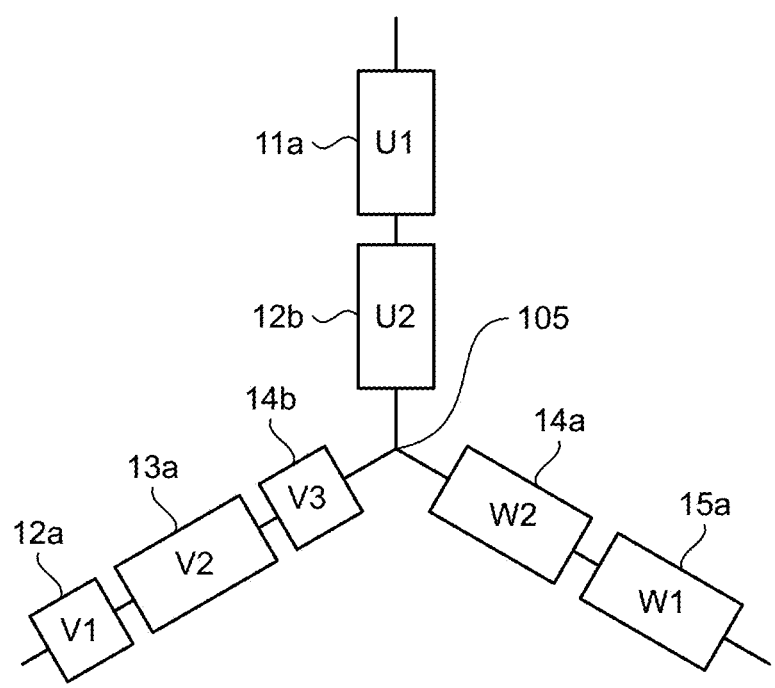
FIG. 18 is a connection diagram of the linear motor according to the fourth embodiment.

FIG. 17 is a schematic diagram of the cross section of the linear motor according to a fourth embodiment. FIG. 18 is a connection diagram of the linear motor according to the fourth embodiment. The tooth 12 is the second tooth including a winding portion 12b that is a U-phase coil and the winding portion 12a that is a V-phase coil. The tooth 14 is the second tooth including a winding portion 14b that is a V-phase coil and the winding portion 14a that is a W-phase coil. That is, in the linear motor 10 according to the fourth embodiment, a movable element 1D that is an armature includes the two second teeth. A winding process of the teeth 12 and 14 is similar to that of the teeth 13 of the linear motor 10 according to the first embodiment.

Figure 19:
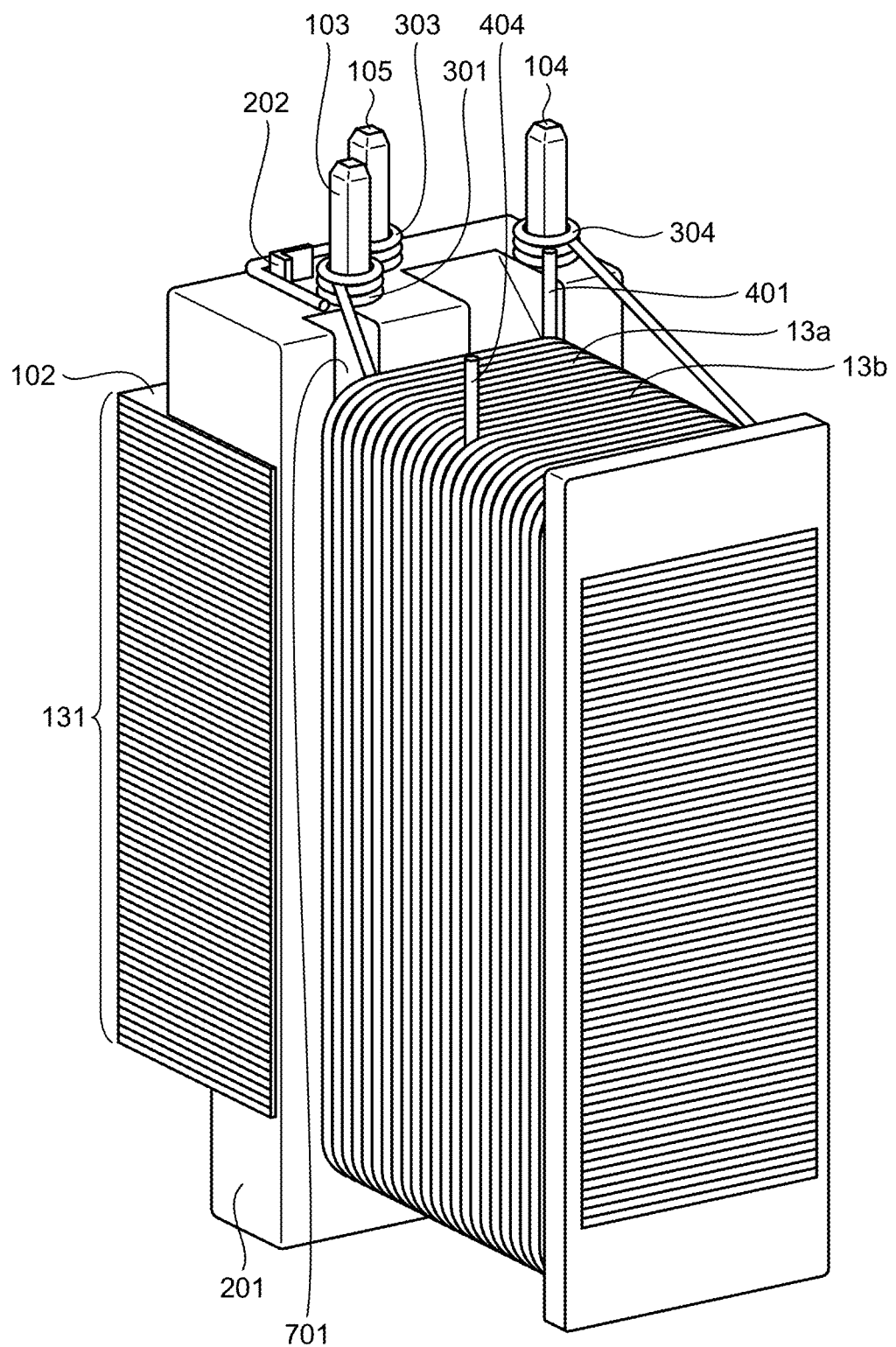
FIG. 19 is a perspective view of the second tooth of the linear motor according to the fourth embodiment.

FIG. 19 is a perspective view of the second tooth of the linear motor according to the fourth embodiment. A winding process of the winding portion 13a that is a first phase is similar to the tooth 13 according to the first embodiment illustrated in FIG. 4. After winding of the winding portion 13a is completed, the crossover line 402 that connects the winding portion 13a and the intermediate portion 303 and the crossover line 403 that connects the intermediate portion 303 and the winding portion 13b are cut.

In the linear motor 10 according to the fourth embodiment, by cutting the crossover line 402 that connects the winding portion 13a and the intermediate portion 303 and the crossover line 403 that connects the intermediate portion 303 and the winding portion 13b, it is possible to separate the winding end electric wire 401 of the winding portion 13a and the winding start electric wire 404 of the winding portion 13b from the intermediate fixing member 105, it is not necessary to connect the winding end electric wire 401 of the winding portion 13a and the winding start electric wire 404 of the winding portion 13b to the neutral point, and it is possible to improve the degree of design freedom.

The configurations described in the above embodiments indicate an example of content and can be combined with other known techniques. Furthermore, the configurations described in the embodiments can be partially omitted or changed without departing from the gist.

REFERENCE SIGNS LIST 1, 1A, 1B, 1C, 1D movable element; 3 stator; 10 linear motor; 11, 12, 13, 14, 15 teeth; 11a, 12a, 12b, 13a, 13b, 14a, 14b, 15a winding portion; 31 permanent magnet; 32 attachment seat; 71 insulating member; 102 electromagnetic steel sheet; 103 winding start fixing member; 104 winding end fixing member; 105 intermediate fixing member; 111, 121, 131, 141, 151 iron core; 201 insulating holding member; 202 crossover projection; 301 winding start portion; 303 intermediate portion; 304 winding end portion; 401, 502, 504 winding end electric wire; 404, 501, 503 winding start electric wire; 402, 403 crossover line; 601, 602 current direction; 701 winding start groove.

The invention claimed is:

1. An armature that is arranged to face a field system via an air gap and is driven by three-phase AC excitation, the armature comprising:
a plurality of teeth including an iron core, an insulating holding member attached to the iron core, and a winding portion in which an electric wire having an insulating cover is wound around the iron core on the insulating holding member and a plurality of coils are formed, wherein
the plurality of teeth includes a first tooth including the winding portion for only a one-phase coil in the plurality of coils and a second tooth including the winding portions for coils of two different phases from each other in the plurality of coils, and
in the second tooth, the winding portions of the two different phases from each other include a single electric wire and are continuously wound via an intermediate fixing member provided on the insulating holding member.

2. The armature according to claim 1, wherein the intermediate fixing member is an electronic neutral point of a connection structure.

3. The armature according to claim 2, wherein the winding portions of the two different phases from each other in the second tooth are wound around the iron core and the insulating holding member in a same winding direction or in winding directions different from each other.

4. An electric motor comprising:
the field system; and
the armature according to claim 3.

5. An electric motor comprising:
the field system; and
the armature according to claim 2.

6. The armature according to claim 1, wherein the winding portions forming the coils of the two different phases from each other are wound to overlap on the iron core and the insulating holding member.

7. An electric motor comprising:
the field system; and
the armature according to claim 6.

8. The armature according to claim 1, wherein the winding portions forming the coils of the two different phases from each other are wound around the iron core and the insulating holding member so as to be arranged in an arrangement direction of the armature and the field system.

9. An electric motor comprising:
the field system; and
the armature according to claim 8.

10. The armature according to claim 1, wherein the winding portions forming the coils of the two different phases from each other have direct contact with each other.

11. An electric motor comprising:
the field system; and
the armature according to claim 10.

12. An electric motor comprising:
the field system; and
the armature according to claim 1.

* * * * *